United States Patent [19]
Ihle

[11] Patent Number: 5,575,461
[45] Date of Patent: Nov. 19, 1996

[54] ELASTIC SUSPENSION FOR ATTACHING DYNAMICALLY STRESSED PERFORMANCE PARTS

[75] Inventor: Erich Ihle, Wadern, Germany

[73] Assignee: Saar-Gummiwerk GmbH, Wadern-Büschfeld, Germany

[21] Appl. No.: 313,888

[22] Filed: Sep. 28, 1994

[30] Foreign Application Priority Data

Oct. 2, 1993 [DE] Germany .......................... 43 33 643.4

[51] Int. Cl.⁶ .............................. B60K 13/04; F16L 3/16
[52] U.S. Cl. ......................... 267/153; 267/141; 267/292
[58] Field of Search .................................. 267/153, 152, 267/141, 141.1, 292, 293, 294, 52, 140.4; 248/610, 60, 634, 635, 638, 562, 636; 180/300, 312, 902, 89.2; 181/207, 206, 208; 188/268

[56] References Cited

U.S. PATENT DOCUMENTS

| | | |
|---|---|---|
| 2,510,963 | 6/1950 | Dibblee . |
| 2,612,370 | 9/1952 | Eger . |
| 2,647,717 | 8/1953 | Norris et al. ............................ 267/141 |
| 3,045,704 | 7/1962 | Williams ............................ 267/153 X |
| 3,195,876 | 7/1965 | Tea ............................................ 267/52 |
| 3,293,887 | 12/1966 | Cassel et al. . |
| 3,301,335 | 1/1967 | Snelling ............................ 267/141 X |
| 3,381,486 | 5/1968 | Laughlin ............................ 267/141 X |
| 3,610,610 | 10/1971 | Chassagne ............................ 267/152 |
| 4,086,977 | 5/1978 | Heiland et al. . |
| 4,380,324 | 4/1983 | Woesler . |
| 4,415,391 | 11/1983 | Reid ........................................ 248/60 |
| 4,494,722 | 1/1985 | Kanaie et al. . |
| 4,634,088 | 1/1987 | Schad ................................... 188/268 |
| 4,638,965 | 1/1987 | DeBruine et al. .................. 248/610 X |
| 4,727,957 | 3/1988 | Fujita . |
| 4,817,909 | 4/1989 | Deane . |
| 4,884,779 | 12/1989 | Drabing et al. . |
| 4,893,595 | 1/1990 | Mertens . |
| 4,893,778 | 1/1990 | Drabing et al. . |
| 5,050,837 | 9/1991 | Hamada et al. . |
| 5,102,107 | 4/1992 | Simon et al. . |
| 5,271,595 | 12/1993 | Simon et al. . |
| 5,435,532 | 7/1995 | Ihle et al. ............................... 267/153 |

FOREIGN PATENT DOCUMENTS

| | | |
|---|---|---|
| 1207268 | 8/1959 | France ................................... 267/141 |
| 2658358 | 11/1979 | Germany . |
| 3445491 | 4/1986 | Germany . |
| 4035728 | 5/1992 | Germany . |
| 4211397 | 9/1993 | Germany . |

*Primary Examiner*—Douglas C. Butler
*Attorney, Agent, or Firm*—James Creighton Wray

[57] ABSTRACT

This invention relates to an inexpensive and easily recyclable elastic suspension system for suspending dynamically stressed parts. A flexible spring element is attachable to a support such as exhaust systems in vehicles. The spring element has an elastic compact structure and is made of a closed-cell foamed material. The closed-cell foamed material may be rubber material having a desired volume. Adjusting the degree of foaming, foam structure and hardness of the foam material allows for adjustments of the area of linearity as well as the gradient of the spring characteristic to accommodate difference in stresses caused by the performance part embedded in the spring element. A retainer for at least partially enclosing the spring element is provided. The retainer may be a flexible and elastic strap enveloping the circumference of the spring element. The retainer may also be a rigid support plate with connectors to connect the retainer to the support. The retainer may be connected to the spring element mechanically or by welding or gluing together, or by other connections which are reversible. Those connections allow for easy separation and recycling of the retainer and the spring element.

2 Claims, 2 Drawing Sheets

ELASTIC SUSPENSION FOR ATTACHING DYNAMICALLY STRESSED PERFORMANCE PARTS

BACKGROUND OF THE INVENTION

The invention describes a suspension for attaching dynamically stressed performance parts to a supporting structure, especially an exhaust system on the bottom of a vehicle, with a spring element made of elastic material.

Elastic suspensions of this type for bedding exhaust systems and catalytic converters are described in DE-C-26 58 358. This known suspension consists of a spring element made of a compact rubber material and in general is annular or loop shaped. In the upper and lower area there are two opposed, almost semicircular slots into which the free ends of the union bows are inserted to the bottom of the vehicle on one side and to the exhaust system on the other side. The geometrical shape and arrangement of the center areas in which there is no material determines the elasticity and spring deflection of the spring element whereby the stays serve as the delimitation when spring deflection occurs. For reinforcement purposes a flexible and elastic insert with tensile strength made of steel wire or spring steel strap, is embedded in the outer areas of the spring element.

One disadvantage of this known suspension is the manufacture of the rubber-metal-connection. The production of this connection is very labor intensive and expensive. On the other hand it is exactly this connection which later on makes it more difficult and expensive to separate and recycle the materials; and especially recycling is increasingly important.

It is especially true, however, that this suspension does not always operate in the linear area. Rather, the spring characteristic displays a relatively small linear area with small gradients and then increases progressively. However, if the statistical travel of the spring is not taken into account, which is due to the dead weight of the exhaust system, a spring characteristic with oscillation paths of approximately 10 mm and a soft spring suspension are the result. The spring characteristics should increase progressively only after the oscillation paths are greater than 10 mm.

SUMMARY OF THE INVENTION

The presented invention was charged with designing an elastic suspension which, in a sufficiently large field of action, has a linear, soft spring characteristic followed by a progressive area, is inexpensive to produce and easy to recycle.

These requirements are fulfilled by the suspension as it is described in the introduction due to the fact that the spring element is a discoid solid body and consists of closed-cell, foamed material.

While the spring characteristic in the known suspension is determined by the geometric shape as well as the size and arrangement of the material-free areas, the spring characteristic of the suspension in accordance with the invention can be adjusted easily via pore size and the degree of foaming. Apart from location holes or -slots for connecting the exhaust system and possibly the connection to the bottom of the vehicle, the cross section of the spring element does not have any material gaps.

The volume weight of the foamed material is one indicator for the pore size and the degree of foaming. The spring element advantageously consists of a closed-cell foamed rubber material, preferably EPDM, with a volume weight of 0.3 ./. 1.0 g/cm$^3$. The spring element in accordance with the invention furthermore is characterized by the significant constancy of the spring characteristic even if it is used for a long period of time and at temperatures exceeding 200° C. The customary working temperatures of an exhaust system range from 100° to 120° C. Due to the closed-cell foam structure no moisture can penetrate the device even if it is damaged. Moisture has the potential of influencing the spring characteristic negatively.

It is advantageous to place the spring element into a so-called loss safety which encloses the spring element at least partially and prevents the exhaust system from tearing off when the spring element breaks. A flectional, elastic support strap with tensile strength made of metal, plastic or fabric and which encloses the circumference or the entire spring element can serve as a loss safety. In this case the spring element must have location holes for connecting the exhaust system and the connection to the bottom of the vehicle. The spring characteristic is partially determined by the elasticity of the support strap.

Another advantageous model is a loss safety which consists of a rigid support plate or retainer whereby, in this case, it is advantageous for the loss safety to be screwed to the bottom of the vehicle and the spring element must only have the receptacle for connecting the exhaust system.

The spring element and the loss safety must only be connected mechanically. However, they can also be welded or glued together. These types of connection are easy to achieve and to reverse. This ensures that the individual materials can be separated economically and recycled at a later date.

In the following paragraphs the invention is explained in more detail with the help of the examples shown in FIGS. 1 through 3.

DETAILED DESCRIPTION OF THE PREFERRED EMBODIMENTS

One suspension in accordance with the invention consists of a discoid spring element 1 made of closed-cell foamed material, preferably rubber material. By adjusting the degree of foaming, the foam structure and hardness accordingly, it is possible to adjust the area of linearity as well as the gradient of the spring characteristic to the stress caused by the performance part which is to be embedded.

Figure 1A:
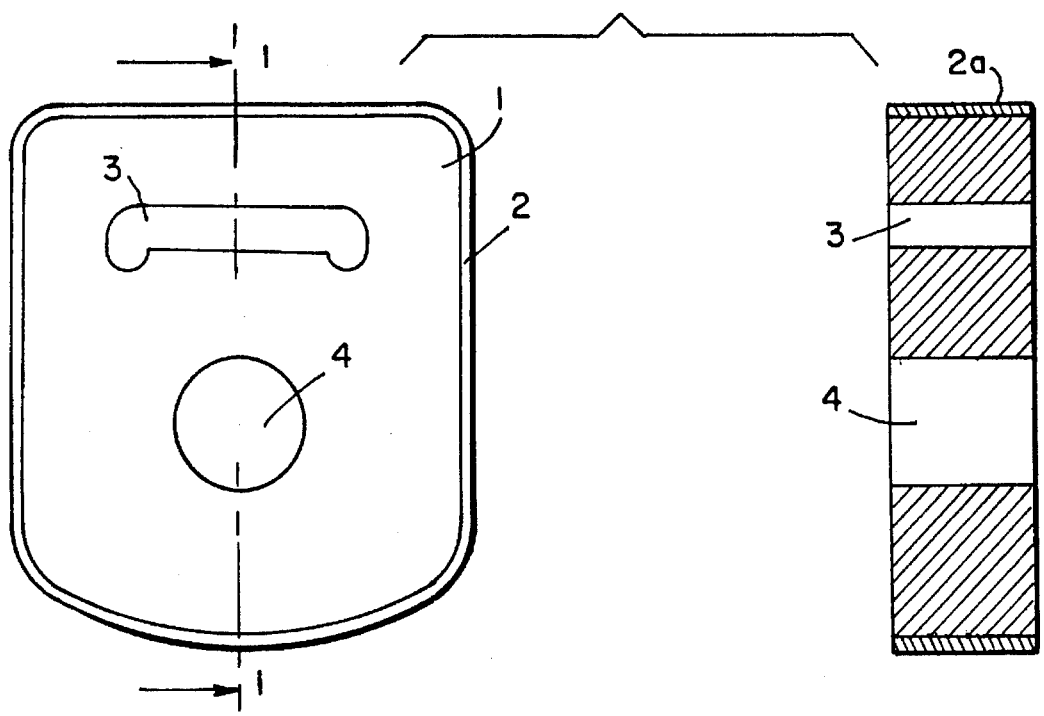
FIG. 1 shows a possible model of a suspension with a spring element whose circumference is enclosed by a support strap which serves as a loss safety.
Figure 1B:
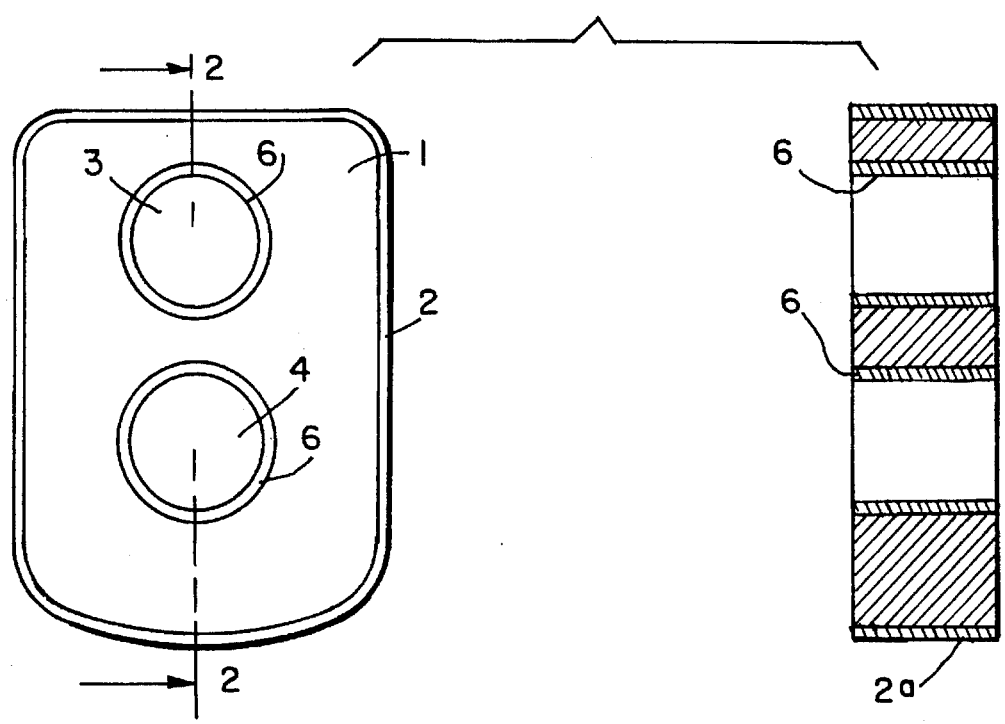

In the example shown in FIG. 1 the spring element 1 is enclosed by a flectional, elastic support strap with tensile strength which serves as a loss safety 2. The support strap and spring element 1 can be connected mechanically only or can be welded or glued. The spring element 1 has a lower receptacle 4 for the performance part as well as an upper receptacle 3 for the connection with the supporting structure. It is also possible to insert metal or plastic bushings 6 into the receptacles 3 and/or 4. The shape of the spring element 1 as well as the receptacles 3, 4 is adjusted to the respective joining elements. In the example shown in FIG. 1a the upper receptacle 3 is a slot, the lower receptacle is circular. In the examples shown in FIG. 1*b* both receptacles 3, 4 are circular.

Figure 2B:
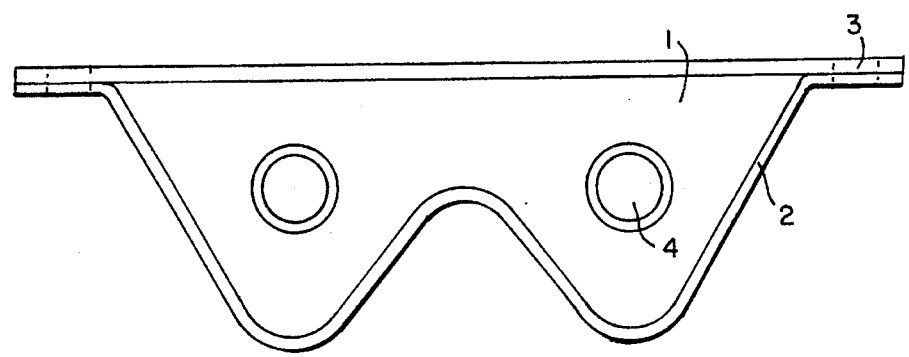
FIG. 2 shows a possible model of a suspension with a spring element which is inserted into a retainer.
Figure 2A:
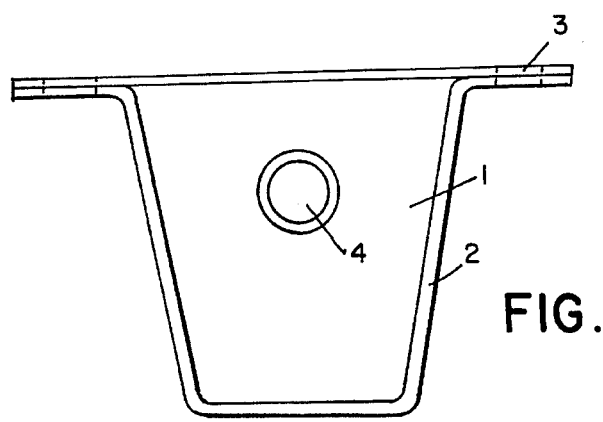

In the models shown in FIG. 2 the spring element 1 is inserted into the rigid retainer which serves as the loss safety 2. The spring element 1 has only one or several receptacles 4 for connecting the performance parts while the receptacles 3 for the connection to the support structure, in the shown examples they consist of a simple threaded joint, are located on the loss safety 2.

Figure 3A:
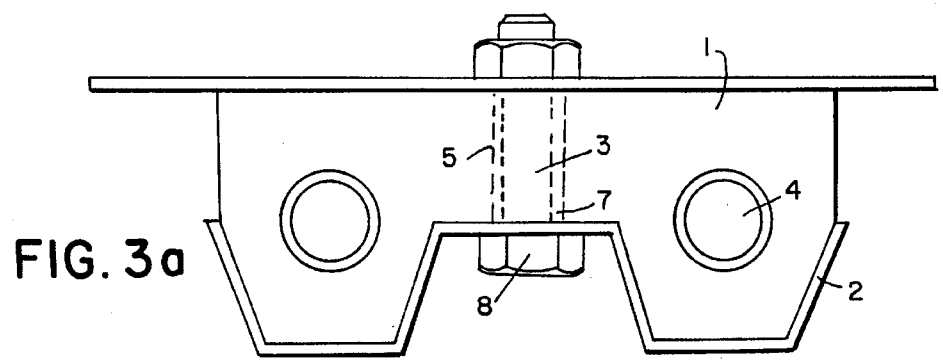
FIG. 3 shows a possible model of a suspension with a spring element inserted into a support plate.

In the models shown in FIG. 3 the spring element 1 is inserted into a support plate which serves as a loss safety 2 whereby the adjusted geometries of spring element 1 and loss safety 2 guarantee that the spring element 1 is securely embedded. The loss safety 2 in turn can be screwed to the supporting structure through receptacle 3 whereby the fastening screw 8 shown in the example in FIG. 3*a* additionally is guided through a corresponding boring 5 in the spring element 1 and secures the spring element 1 additionally. A guide bush 7 can be inserted in the boring 5 either loosely or connected to the loss safety 2, for example.

Figure 3B:
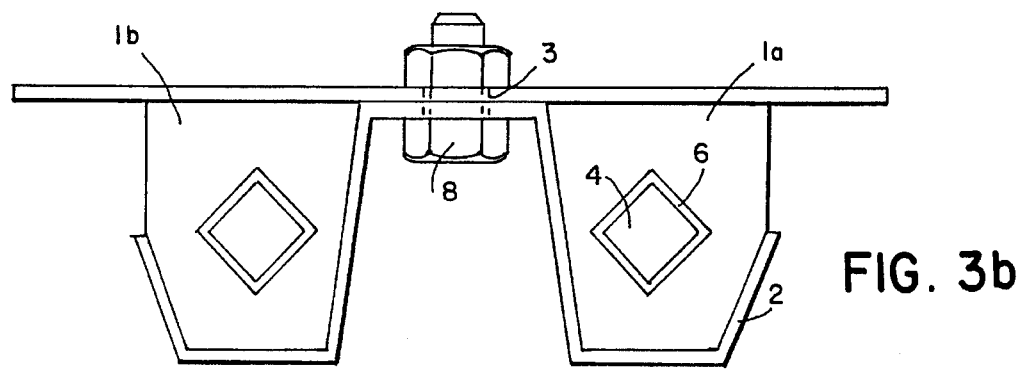

In the example shown in FIG. 3*b* two individual partial spring elements 1*a*, 1*b* are inserted into loss safety 2 and the center of the loss safety 2 is directly screwed to the supporting structure—which is identical to the loss safety 2 in accordance with FIG. 2.

The geometries of the spring elements 1, the receptacles 3, 4 as well as the insertion of bushings 6 into receptacles 3, 4 are each determined by the performance part which is to be connected and the loads which must be absorbed.

I claim:

1. An elastic suspension apparatus for suspending dynamically stressed parts comprising a support and a flexible unitary spring element for attaching to the support, the spring element being an elastic non-porous structure made of a closed-cell foamed material, the foamed material being made of rubber material having a volume between 0.3 and 1 g/cm$^3$, a retainer for at least partially enclosing edges of said spring element, the retainer being a flexible elastic strap enveloping a circumference of the spring element.

2. An elastic suspension apparatus for suspending dynamically stressed parts comprising a support and a flexible unitary spring element for attaching to the support, the spring element being an elastic non-porous structure made of a closed-cell foamed material, the foamed material being made of rubber material having a volume between 0.3 and 1 g/cm$^3$, a retainer for at least partially enclosing edges of said spring element, the retainer being a rigid support plate, and further comprising connectors for connecting the retainer to the support and for holding the spring element therein.

\* \* \* \* \*